Patented Feb. 3, 1931

1,790,932

UNITED STATES PATENT OFFICE

HENRY R. LEE AND IVAN GUBELMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

PROCESS OF PREPARING PURPURIN

No Drawing.  Application filed September 2, 1927.  Serial No. 217,300.

This invention relates to a method of preparing purpurin, otherwise referred to as 1-3-4 tri-hydroxy anthraquinone.

It is an object of this invention to provide a simple, efficient and practical method for the preparation of purpurin, which is a valuable intermediate for dye stuffs.

Other and further important objects of this invention will be apparent from the following description and the appended claims.

Purpurin or 1-3-4 tri-hydroxy anthraquinone has been prepared generally by the oxidation of alizarin or quinizarine.

We have now discovered that purpurin can be easily prepared by the hydrolysis of 3-chloro-quinizarine, namely 1-4 dihydroxy 3-chloro anthroquinone. If 3-chloro-quinizarine be subjected in the presence of concentrated sulphuric acid and boric acid at an elevated temperature for a prolonged period of time it is hydrolized to form purpurin. We have further observed that purpurin may be prepared in one continuous operation from 3-4 dichloro phenol by first preparing the 3-chloro-quinizarine, as described in the copending application of Ivan Gubelmann entitled "Process of preparing 2- (or 3-) chloro-quinizarine," now Patent No. 1,655,863, filed October 31, 1925, and issued January 10, 1928, followed by the hydrolysis of the chlorine group to a hydroxyl group in the same reaction mass. These reactions are probably best expressed by the following chemical equations:

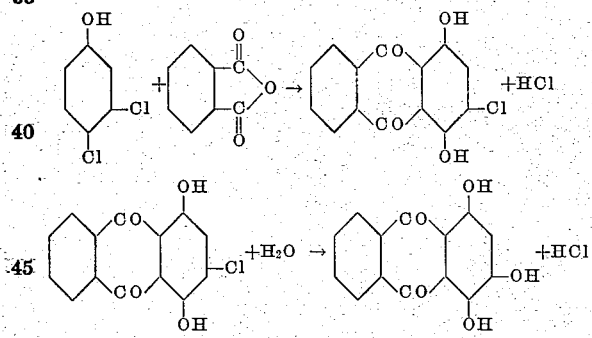

The hydrolysis reaction proceeds slowly in sulphuric acid of about 100% strength at temperatures below 190° C., but is accelerated by raising the temperature to about 220° C. The 1-3-4 trihydroxy anthraquinone obtained directly by this process is a reddish brown powder having a melting point of 248–250° C. After a single recrystallization from alcohol, substantially pure 1-3-4 trihydroxy anthraquinone is obtained having a melting point of 254–255° C., which corresponds to the melting point given by Ullmann in the "Enzyklopadie der Technischen Chemie," edited by Urban and Schwarzenberg 1914 in Berlin volume 1, page 482. 1-3-4 trihydroxy anthraquinone is very sparingly soluble in water from which it crystallizes with one mole of water of crystallization. It dissolves in alcohol imparting to it a yellowish to reddish yellow color. In dilute caustic soda solution it is readily soluble imparting to the solution a purplish red color, which is completely discharged by the action of light and air. It is soluble in concentrated sulphuric acid with a rose red color. By the addition of alum to a sodium carbonate solution of the product, the characteristic red lake of purpurin is formed.

Without limiting our invention to any particular procedure, the following examples, in which parts by weight are given, will serve to illustrate preferred embodiments of our invention:

*Example 1.*—A mixture of 1900 parts of sulphuric acid monohydrate, 110 parts of boric acid, and 300 parts of phthalic anhydride is heated to 195° C. Into this mixture are charged 100 parts of 3,4-dichloro-phenol. The reaction mixture is held for 4 hours at 195 to 200° C. The temperature is now raised to 220° C. and held for 20 hours. The mass is now cooled to 160 to 170° C. and poured into 38,000 parts of cold water. The precipitated product is filtered off. It is then resludged with 6,000 parts of cold water and refiltered and washed until practically free of mineral acid. The filter cake may be dried at 100° C. in vacuo.

*Example 2.*—A mixture of 1900 parts of monohydrate, 110 parts of boric acid and 300 parts of phthalic anhydride is heated to 195° C. There is then added to this mixture 100 parts of 3,4-dichloro-phenol, and a temperature of 195 to 200° C. maintained for 4 hours. 95 parts of water are now added and the temperature raised to 220° C. and held at this point for 20 hours. The isolation of the product is made as in Example 1.

*Example 3.*—A mixture of 1900 parts of sulphuric acid, containing 5% free $SO_3$, 110 parts of boric acid, 300 parts of phthalic anhydride is heated to 195° C. To this mixture are then added 100 parts of 3,4-dichloro-phenol. A temperature of 195 to 200° C. is then maintained for 4 hours. 190 parts of water are now slowly added and the temperature raised to 220° C. and held at 220° C. for 20 hours. The isolation of the product is made as in Example 1.

*Example 4.*—A mixture of 1900 parts of monohydrate, 110 parts of boric acid, 136 parts of 3-chloro-quinizarine is heated to a temperature of 220° C. The temperature of 220° C. is maintained for 20 hours and the isolation of the product made as in Example 1.

The yield of purpurin obtained by the procedure described in any one of the examples is substantially equal to that theoretically expected. The quality of the product without further purification has been sufficiently high for technical uses.

We are aware that numerous details of the process may be varied through a wide range, for instance, the mixture of boric acid, phthalic anhydride, sulphuric acid, and 3,4-dichloro-phenol may be made at lower temperatures than those specified in the examples and the mixture gradually heated up to the reaction temperature; the proportion of the reacting substances may be varied to a large extent without greatly affecting the product; or similar results may be obtained by a variation in the temperatures and time intervals specified. We, therefore, do not propose to limit the patent granted hereon otherwise than necessitated by the prior art and as defined by the appended claims.

We claim as our invention:

1. The process of preparing purpurin, which comprises hydrolyzing 3-chloro-quinizarine.

2. The process of preparing purpurin, which comprises hydrolyzing 3-chloro-quinizarine in the presence of sulphuric acid at an elevated temperature.

3. The process of preparing purpurin, which comprises heating a reaction mixture containing 3-chloro-quinizarine and formed from phthalic anhydride, 3,4-dichloro-phenol, sulphuric acid and boric acid at a temperature above 190° C. for a prolonged period of time.

4. The process of preparing purpurin, which comprises heating a solution of 3-chloro-quinizarine in concentrated sulphuric acid at a temperature of about 220° C. for a prolonged period of time.

5. The process of preparing purpurin, which comprises heating a reaction mass containing 3-chloro-quinizarine and obtained from heating phthalic anhydride and 3,4-dichloro-phenol in concentrated sulphuric acid and boric acid, to about 220° C. for a period of about 20 hours.

In testimony whereof, we have hereunto subscribed our names at Carrollville, Milwaukee County, Wisconsin.

HENRY R. LEE.
IVAN GUBELMANN.